(12) United States Patent
Franken et al.

(10) Patent No.: US 7,631,332 B1  
(45) Date of Patent: Dec. 8, 2009

(54) METHOD AND SYSTEM FOR PROVIDING HOUSEHOLD LEVEL TELEVISION PROGRAMMING INFORMATION

(75) Inventors: Kenneth A. Franken, Iowa City, IA (US); Toufic Moubarak, Iowa City, IA (US); Jack Perry, Marion, IA (US)

(73) Assignee: Decisionmark Corp., Cedar Rapids, IA (US)

(*) Notice: Subject to any disclaimer, the term of this patent is extended or adjusted under 35 U.S.C. 154(b) by 1527 days.

(21) Appl. No.: 10/248,674

(22) Filed: Feb. 7, 2003

Related U.S. Application Data

(63) Continuation of application No. 09/681,171, filed on Feb. 8, 2001, now Pat. No. 6,785,904, which is a continuation-in-part of application No. 09/538,215, filed on Mar. 30, 2000, now Pat. No. 6,252,547, which is a continuation-in-part of application No. 09/092,128, filed on Jun. 5, 1998, now Pat. No. 6,147,642.

(51) Int. Cl.  
  H04N 5/445 (2006.01)  
  G06F 13/00 (2006.01)  
  G06F 3/00 (2006.01)  
(52) U.S. Cl. .............................. 725/49; 725/38; 725/48  
(58) Field of Classification Search .................... 725/39, 725/48, 49  
See application file for complete search history.

(56) References Cited

U.S. PATENT DOCUMENTS

| | | | |
|---|---|---|---|
| 4,701,934 A | 10/1987 | Jasper | |
| 5,535,430 A | 7/1996 | Aoki et al. | |
| 5,587,715 A | 12/1996 | Lewis | |
| 5,778,135 A | 7/1998 | Ottesen et al. | |
| 5,778,317 A * | 7/1998 | Kaminsky | 455/450 |
| 5,796,948 A | 8/1998 | Cohen | |
| 5,797,082 A | 8/1998 | Lusignan | |
| 5,848,418 A | 12/1998 | de Souza et al. | |
| 5,950,127 A | 9/1999 | Nitta et al. | |
| 5,955,988 A * | 9/1999 | Blonstein et al. | 342/359 |
| 6,002,394 A | 12/1999 | Schein et al. | |
| 6,144,944 A | 11/2000 | Kurtzman, II et al. | |
| 6,147,642 A | 11/2000 | Perry et al. | |
| 6,154,172 A | 11/2000 | Piccionelli et al. | |

(Continued)

FOREIGN PATENT DOCUMENTS

DE  200 17 785 U  12/2000

(Continued)

OTHER PUBLICATIONS

Printed three pages of a website on Apr. 13, 2000. The WEB address was www.antennaweb.org. Applicants know a similar website was online prior to this date, by are unsure of the precise first date of such website. The Applicants suspect it may have been as early as Oct. 1, 1999.

(Continued)

*Primary Examiner*—Hunter B. Lonsberry  
(74) *Attorney, Agent, or Firm*—Simmons Perrine Moyer Bergman PLC

(57) ABSTRACT

A computer and internet-based system and method for providing television and radio programming information and channel assignments to users, which is based upon a household level determination of a location of the user.

26 Claims, 1 Drawing Sheet

U.S. PATENT DOCUMENTS

| | | | |
|---|---|---|---|
| 6,160,545 A * | 12/2000 | Eyer et al. | 715/721 |
| 6,209,100 B1 | 3/2001 | Robertson et al. | |
| 6,252,547 B1 | 6/2001 | Perry et al. | |
| 6,332,127 B1 | 12/2001 | Bandera et al. | |
| 6,362,837 B1 | 3/2002 | Ginn | |
| 6,487,538 B1 | 11/2002 | Gupta et al. | |
| 6,606,659 B1 | 8/2003 | Hegli et al. | |
| 6,698,020 B1 | 2/2004 | Zigmond et al. | |
| 6,732,176 B1 | 5/2004 | Stewart et al. | |
| 6,742,032 B1 | 5/2004 | Castellani et al. | |
| 6,748,422 B2 | 6/2004 | Morin et al. | |
| 6,754,833 B1 | 6/2004 | Black et al. | |
| 6,792,615 B1 | 9/2004 | Rowe et al. | |
| 6,804,675 B1 | 10/2004 | Knight et al. | |
| 6,807,566 B1 | 10/2004 | Bates et al. | |
| 6,829,599 B2 | 12/2004 | Chidlovskii | |
| 6,829,613 B1 | 12/2004 | Liddy | |
| 6,859,791 B1 | 2/2005 | Spagna et al. | |
| 6,898,571 B1 | 5/2005 | Val et al. | |
| 6,912,398 B1 | 6/2005 | Domnitz | |
| 6,966,028 B1 | 11/2005 | Beebe | |
| 6,968,513 B1 | 11/2005 | Rinebold et al. | |
| 6,976,010 B2 | 12/2005 | Banerjee et al. | |
| 7,062,533 B2 | 6/2006 | Brown et al. | |
| 7,069,234 B1 | 6/2006 | Cornelius et al. | |
| 7,069,319 B2 | 6/2006 | Zellner et al. | |
| 7,089,194 B1 | 8/2006 | Berstis et al. | |
| 7,092,953 B1 | 8/2006 | Haynes | |
| 7,103,215 B2 | 9/2006 | Buzuloiu et al. | |
| 7,120,615 B2 | 10/2006 | Sullivan et al. | |
| 7,124,101 B1 | 10/2006 | Mikurak | |
| 7,136,875 B2 | 11/2006 | Anderson et al. | |
| 7,162,471 B1 | 1/2007 | Knight et al. | |
| 7,162,508 B2 | 1/2007 | Messina | |
| 7,165,041 B1 | 1/2007 | Guheen et al. | |
| 7,171,620 B2 | 1/2007 | Castellani et al. | |
| 7,174,453 B2 | 2/2007 | Lu | |
| 7,200,635 B2 | 4/2007 | Yashchin et al. | |
| 7,219,148 B2 | 5/2007 | Rounthwaite et al. | |
| 7,219,153 B1 | 5/2007 | Day | |
| 7,222,157 B1 | 5/2007 | Sutton, Jr. et al. | |
| 7,222,163 B1 | 5/2007 | Girouard et al. | |
| 2001/0025255 A1 | 9/2001 | Gaudian | |
| 2001/0037415 A1 | 11/2001 | Freishtat et al. | |
| 2002/0083016 A1 | 6/2002 | Dittrich et al. | |
| 2002/0095332 A1 | 7/2002 | Doherty et al. | |
| 2002/0107701 A1 | 8/2002 | Batty et al. | |
| 2002/0199188 A1 | 12/2002 | Sie et al. | |
| 2003/0004880 A1 | 1/2003 | Banerjee et al. | |
| 2003/0110130 A1 | 6/2003 | Pelletier | |
| 2003/0154249 A1 | 8/2003 | Crockett et al. | |
| 2003/0165241 A1 | 9/2003 | Fransdonk | |
| 2003/0171990 A1 | 9/2003 | Rao et al. | |
| 2004/0034559 A1 | 2/2004 | Harris et al. | |
| 2004/0076279 A1 | 4/2004 | Taschereau | |
| 2004/0083133 A1 | 4/2004 | Nicholas et al. | |
| 2004/0143667 A1 | 7/2004 | Jerome | |
| 2004/0236832 A1 | 11/2004 | Morris et al. | |
| 2005/0050097 A1 | 3/2005 | Yeh et al. | |
| 2005/0071178 A1 | 3/2005 | Beckstrom et al. | |
| 2005/0071417 A1 | 3/2005 | Taylor et al. | |
| 2005/0075929 A1 | 4/2005 | Wolinsky et al. | |
| 2005/0086112 A1 | 4/2005 | Shkedi | |
| 2005/0165615 A1 | 7/2005 | Minar | |
| 2005/0187823 A1 | 8/2005 | Howes | |
| 2005/0203849 A1 | 9/2005 | Benson | |
| 2005/0204005 A1 | 9/2005 | Purcell et al. | |
| 2005/0240487 A1 | 10/2005 | Nemetz et al. | |
| 2005/0251399 A1 | 11/2005 | Agarwal et al. | |
| 2005/0256679 A1 | 11/2005 | Bartol et al. | |
| 2005/0286721 A1 | 12/2005 | Lamberg | |
| 2005/0289145 A1 | 12/2005 | Voegel | |
| 2006/0020714 A1 | 1/2006 | Girouard et al. | |
| 2006/0031483 A1 | 2/2006 | Lund et al. | |
| 2006/0058951 A1 | 3/2006 | Cooper et al. | |
| 2006/0095502 A1 | 5/2006 | Lewis et al. | |
| 2006/0106866 A1 | 5/2006 | Green et al. | |
| 2006/0173985 A1 | 8/2006 | Moore | |
| 2006/0229899 A1 | 10/2006 | Hyder et al. | |
| 2006/0235824 A1 | 10/2006 | Cheung et al. | |
| 2006/0236257 A1 | 10/2006 | Othmer et al. | |
| 2006/0242072 A1 | 10/2006 | Peled et al. | |
| 2006/0253784 A1 | 11/2006 | Bower et al. | |
| 2006/0282328 A1 | 12/2006 | Gerace et al. | |
| 2006/0282426 A1 | 12/2006 | Spears | |
| 2006/0287916 A1 | 12/2006 | Starr et al. | |
| 2007/0011155 A1 | 1/2007 | Sarkar | |
| 2007/0016598 A1 | 1/2007 | Tessman, Jr. et al. | |
| 2007/0027770 A1 | 2/2007 | Collins et al. | |
| 2007/0038567 A1 | 2/2007 | Allaire et al. | |
| 2007/0040850 A1 | 2/2007 | Coleman | |
| 2007/0047568 A1 | 3/2007 | Wang et al. | |
| 2007/0061363 A1 | 3/2007 | Ramer et al. | |
| 2007/0061839 A1 | 3/2007 | South, Jr. | |
| 2007/0063999 A1 | 3/2007 | Park | |
| 2007/0070978 A1 | 3/2007 | Bell et al. | |
| 2007/0078675 A1 | 4/2007 | Kaplan | |
| 2007/0078709 A1 | 4/2007 | Rajaram | |
| 2007/0083408 A1 | 4/2007 | Altberg et al. | |
| 2007/0083929 A1 | 4/2007 | Sprosts et al. | |
| 2007/0094263 A1 | 4/2007 | Tessman, Jr. et al. | |
| 2007/0100690 A1 | 5/2007 | Hopkins | |
| 2007/0112678 A1 | 5/2007 | Himelfarb | |
| 2007/0112735 A1 | 5/2007 | Holloway et al. | |
| 2007/0116037 A1 | 5/2007 | Moore | |
| 2007/0118533 A1 | 5/2007 | Ramer et al. | |
| 2007/0123275 A1 | 5/2007 | Faraz | |
| 2007/0124207 A1 | 5/2007 | Faber et al. | |
| 2007/0127555 A1 | 6/2007 | Lynch | |
| 2007/0127650 A1 | 6/2007 | Altberg et al. | |
| 2007/0130014 A1 | 6/2007 | Altberg et al. | |
| 2007/0130015 A1 | 6/2007 | Starr et al. | |
| 2007/0133034 A1 | 6/2007 | Jindal et al. | |
| 2007/0135991 A1 | 6/2007 | Riise et al. | |
| 2007/0136428 A1 | 6/2007 | Boutboul et al. | |

FOREIGN PATENT DOCUMENTS

| | | | |
|---|---|---|---|
| EP | 0 183 392 A | 6/1986 | |
| EP | 1234442 B1 | 5/2003 | |
| GB | 2377510 A | 1/2003 | |
| GB | 2428832 A | 2/2007 | |
| JP | 06-268934 | 9/1994 | |
| WO | WO 98 03012 A | 1/1998 | |
| WO | WO 99 14947 A | 3/1999 | |
| WO | WO 99 23813 A | 5/1999 | |
| WO | 02 23435 | 3/2002 | |
| WO | 03038695 A1 | 8/2003 | |
| WO | 2007 044500 A2 | 4/2007 | |

OTHER PUBLICATIONS

Applicants are aware of use of paper maps showing color coverage areas relating to suitability of a particular antenna. Applicants are unaware of the actual first date, but suspect it may be around Jan. 1, 1999.

European Standard Search Report dated Aug. 2, 2001.

* cited by examiner

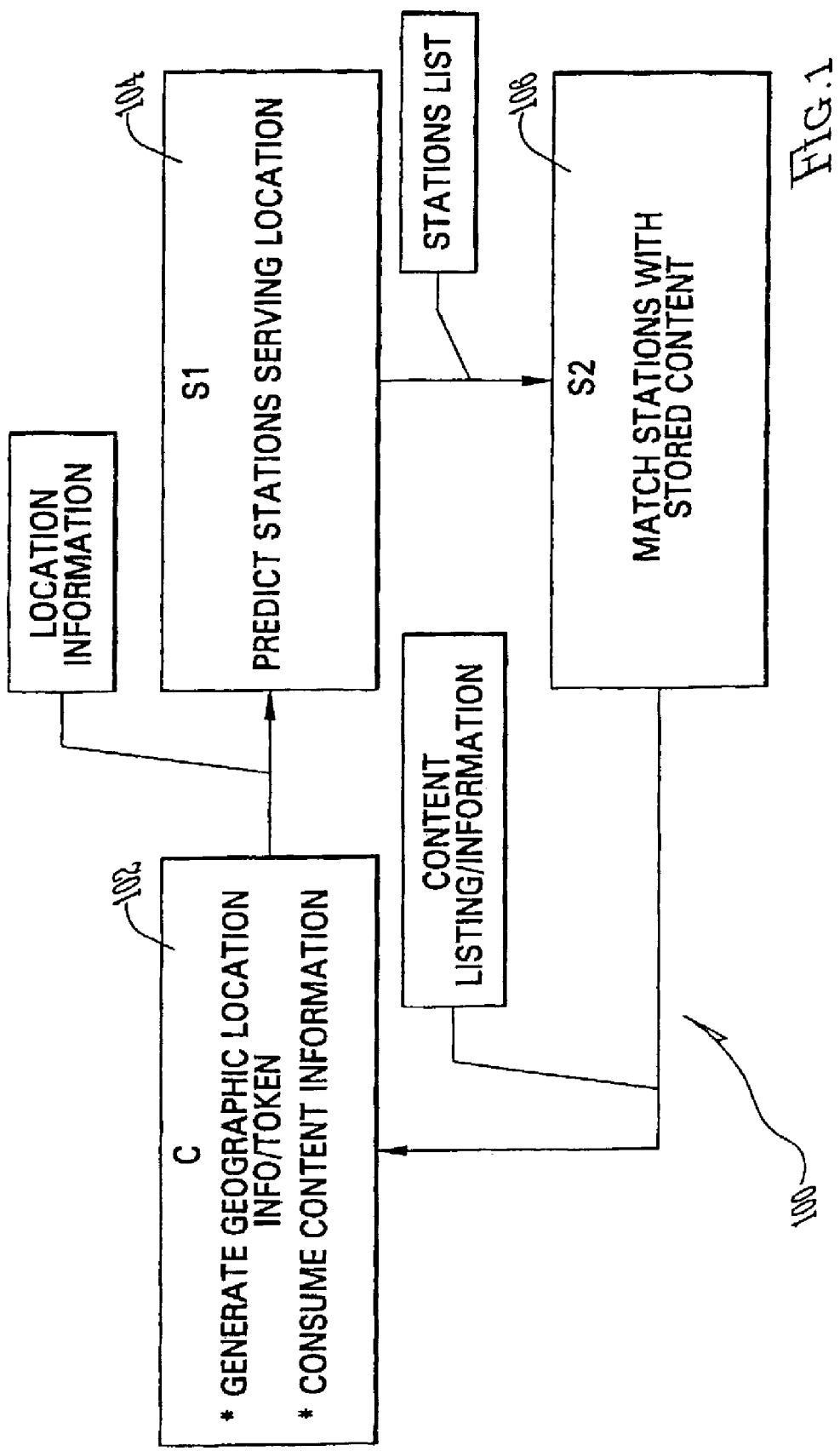

METHOD AND SYSTEM FOR PROVIDING HOUSEHOLD LEVEL TELEVISION PROGRAMMING INFORMATION

CROSS REFERENCE TO RELATED APPLICATIONS

This application is a continuation of application Ser. No. 09/681,171, filed on Feb. 8, 2001, entitled "METHOD AND SYSTEM FOR PROVIDING HOUSEHOLD LEVEL TELEVISION PROGRAMMING INFORMATION", which is a continuation-in-part (CIP) of application entitled "METHOD AND APPARATUS FOR LIMITING ACCESS TO SIGNALS DELIVERED VIA THE INTERNET", having Ser. No. 09/538,215 and filed on Mar. 30, 2000, and now issued as U.S. Pat. No. 6,252,547 on Jun. 26, 2001, which is a continuation-in-part (CIP) of application Ser. No. 09/092,128 for "METHOD AND APPARATUS FOR LIMITING ACCESS TO SATELLITE COMMUNICATION SIGNALS", filed on Jun. 5, 1998, now issued as U.S. Pat. No. 6,147,642. This application also is related to co-pending application entitled "INDIVIDUALIZED CONTENT GUIDE", application Ser. No. 09/681,172 filed on Feb. 8, 2001. The above-referenced applications are incorporated herein in their entirety by this reference.

BACKGROUND OF INVENTION

In recent years, with the proliferation of sources of television programming including conventional terrestrially broadcast TV, cable TV, and satellite-delivered TV, numerous programming choices exist for a consumer. Consumers often desire to have a guide which shows the programming choices available at various times. The magazine, TV Guide, is one well-known example of a printed programming guide.

While TV Guide has enjoyed much success over the years, it has some drawbacks. First of all, with the large number of programming choices at any given time, it becomes increasingly difficult for a consumer to make a selection. This difficulty is compounded by the fact that a typical TV Guide is usually printed for a designated marketing area (DMA), which, in a very crude approximation, is generally an area of about a 100-mile radius from the location of the broadcast towers. Numerous independent municipalities are located within every DMA. This can result in a programming guide which contains programs which are not available to a particular customer. For example, since there are often several independent cable TV providers servicing the various communities in a DMA, with each cable TV company providing different services, any one viewer may need to sift through programming which is not accessible to them.

TV Guide Online is an example of a web-based programming guide which provides a user with a programming list which is individualized to the viewer based upon the viewer's zip code. This type of system works best when one and only one cable operator provides service to the entire zip code. Furthermore, TV Guide Online assumes that the signal strength of terrestrially broadcast stations is the same throughout the zip code. This is not correct.

Consequently, there exists a need for improved methods and systems for providing TV programming information to viewers in an efficient manner.

SUMMARY OF INVENTION

It is an object of the present invention to provide a system and method for providing TV programming in an efficient manner.

It is a feature of the present invention to utilize a household level programming guide.

It is another feature of the present invention to include a geocoding program which accepts street addresses, latitude/longitude (lat/lon) coordinates, or other household level location identifiers.

It is another feature of the present invention to precisely match available programming to a particular household or business location.

It is another feature of the present invention to provide cable channel assignment numbers along with the cable network designations when programming information is provided to a particular home.

It is an advantage of the present invention to achieve improved efficiency in delivery of programming information to viewers.

It is another advantage of the present invention to facilitate parental blocking of unwanted channels.

The present invention is an apparatus and method for providing household level TV programming information, which is designed to satisfy the aforementioned needs, provide the previously stated objects, include the above-listed features, and achieve the already articulated advantages. The present invention is carried out in a "wasted time-less" manner in a sense that the time consumed by a viewer in sifting through programming information which is not available at a particular location, and the time taken by a consumer after a programming selection has been made, to find the proper local channel assignment, has been greatly reduced.

Accordingly, the present invention is a system and method for delivery of TV programming information, including a geocoding program for accepting street addresses, latitude/longitude coordinates, or other unique identifiers of a location, and limiting the amount of information provided based upon unique identifiers of location.

BRIEF DESCRIPTION OF DRAWINGS

The invention may be more fully understood by reading the following description of the preferred embodiments of the invention, in conjunction with the appended drawings wherein:

FIG. 1 is a simplified block diagram view of a system of the present invention.

DETAILED DESCRIPTION

Now referring to the drawings wherein like numerals refer to like matter throughout, and more specifically referring to FIG. 1, there is shown a system of the present invention generally designated 100, including a consumer PC 102. Consumer PC 102 can be a general-purpose computer or any type of information appliance capable of receiving and displaying information from/to an operator. At least some of the information exiting the consumer PC 102 is representative of a unique location of the consumer PC 102. For example, street address, lat/lon coordinates, or some other unique location identifier (such as a 9-digit zip code or a token that identifies location information stored on another computer) is output by consumer PC 102. This can be as a result of user input, such as a keyboard and data entry screen, or it may be a computer-provided token. Street address is used herein to refer to a typical household address with a house number and a street name. This unique location information is provided, via a network, the Internet, or other digital data communication system, to a station prediction server 104. In a preferred embodiment, consumer PC 102 is coupled to station prediction server 104 via a broadband internet connection which is a coaxial cable TV cable which provides internet access to said consumer PC 102. It should be understood that other means of information transmission could be used as well, such as telephone, DSL, wireless, etc. Consumer PC 102 may be a simple stand-alone PC or in a preferred embodiment, it is coupled to a television set or has a PCDTV board therein for receiving broadcast, cable, or satellite television signals. The term "PCDTV board" is used to describe any type of apparatus used in conjunction with a microprocessor in a PC which is capable of receiving and demodulating an incoming television signal irrespective if it is terrestrially broadcast or provided over a cable TV network. It is also believed that television programming will become available over the Internet so the consumer PC 102 would be preferably capable of receiving programming (which is also broadcast on terrestrial television station broadcasts), along with other web-based content.

Generally, station prediction server 104 will perform computations to generate a list of electronically transmitted programming options which are available to the viewer. This could be, but need not be, limited to a list of broadcast television or radio stations which will be available for use by the viewer. The list could also include television stations which are available over the Internet. These computations can include signal strength computations for the terrestrial broadcast signals in the vicinity of the user's location. Various methods of signal strength calculations are possible. Depending upon tradeoffs made regarding the speed and the accuracy of the station prediction server, the software to perform these tasks can range from simple theoretical or empirical propagation curves to the more elaborate Longley-Rice computations, with adjustments for the type of antenna and antenna-mounting environment, as well as terrain or obstructions between the transmitter and the receiver at the user's location. Details of performing the signal strength calculations and station determination are provided in the above-referenced co-pending applications.

Station prediction server 104 could also use the location information to determine which cable providers serve the viewer's location.

Consumer PC 102 can also be used by the consumer or viewer to provide useful information, such as the level of cable TV or satellite TV service, if any, actually subscribed to by the consumer. Consumer PC 102 can also be used to convey information relating to other preferences (other than mere ability to receive the signal) with which the consumer might like to have programming information pre-processed before being used by the consumer; e.g., the program listings can be sorted by type or category of programming desired by the consumer, such as sports, full-length movies, etc. More detail on such individualized programming guides is included in the above-referenced patent application entitled "Individualized Content Guide."

Station prediction server 104 further has information therein, or accessible therefrom, relating to stations and channels and other programming available via cable (CATV or cable radio) and satellite delivery to various locations. This information is available for purchase from sources such as Tribune Media Services of 435 N. Michigan Ave., Suite 1500, Chicago, Ill. USA or TV Data Technologies, LLP of 333 Glen St., Glens Falls, N.Y. 12801, USA.

Programming content matching server 106 takes a station list from station prediction server 104 and matches these stations with well-known programming content for such stations, and provides household level customized content listing back to the consumer PC 102. The information to perform this step is also available from sources listed in the preceding paragraph.

The programming content matching server 106 can now assign a particular channel number to the programming available at the household level. This relieves the viewer from the task of associating station call letters or network affiliations to channel numbers. For example, a local FOX television affiliate may broadcast to two nearby viewers—one at a first location and another at a second location on a single UHF channel. The same channel might be provided to each of these viewers via their local cable providers (assuming the two locations are in nearby towns, each with independent cable TV operators). One cable TV provider might provide it on cable channel 8, and the other on cable channel 2. The present invention, via server 106, has a database of information available which can be used to provide each of these two viewers with the content of programming information available, as well as the proper cable channel assignments for their own cable operator.

Server 104 and server 106 are described herein as being distinct servers. It should be understood that this is merely one possible design. A single server could be used to perform the tasks of servers 104 and 106. Multiple servers could also be used as well.

In operation, the apparatus and method of the present invention as shown and described in FIG. 1, could function as follows:

1. A viewer, through an HTML data entry form, inputs a local address (street address or lat/lon, etc.) of a household or business location.

Alternatively, the viewer's computer will automatically provide such information through a token or otherwise.

2. The local address, if it is a street address, is geo-coded to determine lat/lon.

3. A signal strength prediction is made for the lat/lon for various terrestrially broadcast TV stations in the vicinity of the lat/lon.

4. A list of stations otherwise available to that lat/lon via cable or satellite is also generated, using a point in polygon method or another method, from a database providing detailed programming information for a variety of locations.

4 (a) The list of stations may be either expanded or restricted based upon business rules governing delivery of programming, such as sports blackouts, syndicated exclusivity, satellite delivered distant network service, etc.

5. A complete list of stations available to the viewer is then generated.

6. The complete list of stations is matched with stored programming content and with cable channel assignments, where appropriate.

7. The information is then preferably displayed to the viewer on consumer PC 102 in a format as described in the above-mentioned co-pending application entitled "Individualized Content Guide."

8. The viewer then can efficiently determine what programming is available on which channel. The viewer may elect to block a channel based upon this information. The viewer may elect to watch a particular channel, or the viewer may opt to avoid watching based upon this information. Numerous other uses of the information are possible.

It should be understood that the information generated by the present invention need not be used solely for displaying the same to customers. The information may be provided to other persons, entities or equipment where it could be stored, manipulated or otherwise used for another purpose.

Throughout this description, reference is made to a location of a viewer with respect to terrestrially broadcast signals, because it is believed that the beneficial aspects of the present invention would be most readily apparent when used in connection with such signal strength limitations; however, it should be understood that the present invention is not intended to be so limited and should be hereby construed to include other content generating criteria, such as whether the viewer is in an area serviced by cable TV and whether the viewer is a subscriber to cable TV, etc.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

The invention claimed is:

1. An electronic programming guide apparatus comprising:
   a PC at a first household location;
   a computer system at a second location, coupled to said PC via a computer network;
   said PC providing information regarding a local address of said first household location to said computer system;
   wherein said information regarding a local address comprises information identifying the first household location other than a five-digit zip code; and,
   said computer system adapted and configured to generate a record of electronically transmitted programming which is available to be received at said first household location, and for generating an electronic programming guide based upon said record.

2. An apparatus of claim 1 wherein said information regarding a local address further comprises a street address.

3. An apparatus of claim 2 wherein said first household location is a location occupied by a commercial enterprise.

4. An apparatus of claim 2 wherein said first household location is a location occupied by a dwelling.

5. An apparatus of claim 1 wherein said information regarding a local address is a latitude/longitude pair.

6. An apparatus of claim 2 wherein said record of electronically transmitted programming which is available to be received at said first household location includes a list of terrestrially broadcast television stations which are determined to exceed a predetermined level of signal strength at said first household location.

7. An apparatus of claim 6 wherein said record of electronically transmitted programming which is available to be received at said first household location includes a list of terrestrially broadcast television stations which are determined, via calculations, to exceed a predetermined level of signal strength at said first household location; and,
   said calculations involve a Longley-Rice signal strength calculation.

8. An apparatus of claim 7 wherein said record of electronically transmitted programming which is available to be received at said first household location includes a list of cable programming channels which are available to a cable subscriber at said first household location.

9. An apparatus of claim 8 wherein said electronic programming guide includes a representation of a first cable channel assignment for a first terrestrially broadcast station, which has a broadcast coverage area including said first household location and a second household location, said first cable channel assignment is different from a second cable channel assignment which is also provided by said computer system, to a viewer at said second household location for said first terrestrially broadcast station.

10. An apparatus of claim 9 wherein said electronic programming guide includes a representation of a first channel assignment for a first satellite delivered network, which has a marketing area including said first household location and a second household location, said first channel assignment is different from a second channel assignment which is also provided by said computer system, to a viewer at said second household location for said satellite delivered broadcast network.

11. An apparatus of claim 1 wherein said electronic programming guide comprises a radio programming guide.

12. A method of providing information relating to electronically transmitted programming comprising the steps of:
   providing digital information representative of a local address of a first household level location;
   said local address comprises an address which is more geographically precise than both a five-digit zip code assigned to said first location and a proximity characteristic of said first household level location with respect to a town;
   generating a list of stations available at said first household level location;
   matching said list of stations to predetermined programming content associated with stations on said list of stations; and
   providing to said first household level location a signal representative of a programming guide which has been tailored to exclude programming content which is not available at said first household level location.

13. A method of claim 12 wherein said local address is a street address.

14. A method of claim 13 wherein said step of generating a list of stations at said first household level location includes a step of determining a signal strength at said first household level location of terrestrially broadcast signals which exceed a predetermined threshold.

15. A method of claim 14 wherein said step of generating a list of stations comprises making a determination of a characteristic of cable television programming which is provided to said first household level location.

16. A method of claim 15 wherein said step of matching said stations comprises making a local cable channel assignment determination for said first household level location.

17. A method of claim 16 wherein said programming guide has included therein only programming which is available at said first household level location.

18. A method of claim 17 wherein said programming guide includes information relating to programming available from at least the following sources: terrestrially broadcast television, cable television, satellite television, and internet-delivered television programming.

19. A method of claim 18 wherein said step of making a local cable channel assignment determination for said first household level location comprises assigning a cable channel number for a first terrestrially broadcast station, which has a broadcast coverage area including said first household level location and a second location, said first cable channel assignment is different from a second cable channel assignment which is also provided to a viewer at said second location for said first terrestrially broadcast station.

20. A system comprising:
   a first PC, disposed at a first viewer location, which is in a private single family dwelling, having a broadband internet connection via a coaxial cable TV cable which also carries cable TV signals to said first PC;

said first PC adapted and configured to provide digital information regarding a street address of said first location without a requirement for repeated user input of such street address;

said first PC configured to receive television programming signals from said coaxial cable TV cable;

a computer system, disposed at a server location and coupled to said first PC via an internet connection, said computer system executing software which is configured to generate a list of television programming options which are available to a viewer at said first viewer location, said list including only television programming options which are available to a viewer at said first viewer location;

said computer system further executing software which is configured to generate a programming guide based upon said list of television programming options;

wherein said list includes a list of terrestrially broadcast television stations which exceed a predetermined threshold of signal strength at said first viewer location;

wherein said list further includes a list of cable programming channels which are available to a cable subscriber at said viewer location;

wherein said programming guide includes a representation of a first cable channel assignment for a first terrestrially broadcast station, which has a broadcast coverage area including said first viewer location and a second viewer location, said first cable channel assignment is different from a second cable channel assignment which is also provided by said computer system, to a viewer at said second viewer location for said first terrestrially broadcast station;

wherein said programming guide includes a representation of a first channel assignment for a first satellite delivered network, which has a marketing area including said first viewer location and a second viewer location, said first channel assignment is different from a second channel assignment which is also provided by said computer system, to a viewer at said second viewer location for said satellite delivered broadcast network; and, wherein said programming guide includes information relating to programming available from at least one of the following sources: terrestrially broadcast television, cable television, satellite television, and internet-delivered television programming.

21. A system comprising:

a first PC, disposed at a first viewer location, which is in a private single family dwelling, having a broadband internet connection via a DSL line;

said first PC adapted and configured to provide digital information regarding a street address of said first location without a requirement for repeated user input of such street address;

said first PC further including a PCDTV board therein which is coupled to and receives television programming signals on a signal cable;

a computer system, disposed at a server location and coupled to said first PC via an internet connection, said computer system executing software which is adapted and configured to generate a list of television and FM radio programming options which are available to a viewer at said first viewer location, said list including only television and FM radio programming options which are available to a viewer at said first viewer location;

said computer system further executing software which is adapted and configured to generate a programming guide based upon said list of television and FM radio programming options;

wherein said list includes a list of terrestrially broadcast television and FM radio stations which are determined, via Longley-Rice calculations, to exceed a predetermined threshold of signal strength at said first viewer location;

wherein said list further includes a list of cable programming channels which are available to a cable subscriber at said viewer location;

wherein said programming guide includes a representation of a first cable channel assignment for a first terrestrially broadcast station, which has a broadcast coverage area including said first viewer location and a second viewer location, said first cable channel assignment is different from a second cable channel assignment which is also provided by said computer system, to a viewer at said second viewer location for said first terrestrially broadcast station;

wherein said programming guide includes a representation of a first channel assignment for a first satellite delivered network, which has a marketing area including said first viewer location and a second viewer location, said first channel assignment is different from a second channel assignment which is also provided by said computer system, to a viewer at said second viewer location for said satellite delivered broadcast network; and, wherein said programming guide includes information relating to programming available from at least the following sources: terrestrially broadcast television, cable television, satellite television, and internet-delivered television programming as well as FM radio.

22. A system of claim 21 wherein said signal cable and said DSL line are spatially coextensive.

23. A method of claim 12 further including the step of restricting said predetermined program content based upon a sports blackout business rule.

24. A system of claim 21 wherein said list is restricted based upon a predetermined sports blackout business rule.

25. A system of claim 20 wherein said list is restricted based upon a predetermined business rule.

26. A system of claim 20 wherein said predetermined business rule includes a rule based upon syndicated exclusivity.

* * * * *